Figure 1:
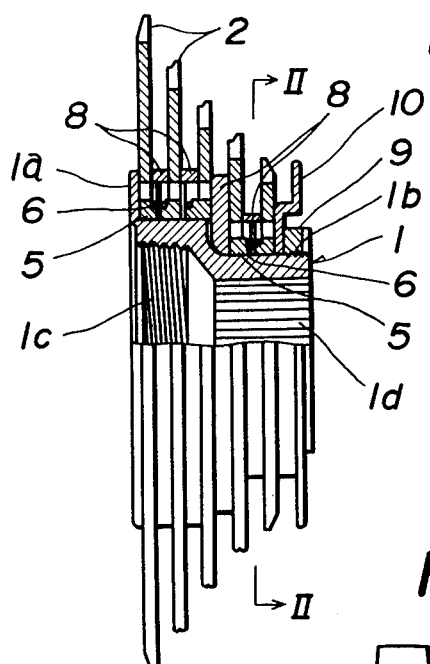

United States Patent [19]

Kine

[11] 4,124,107

[45] Nov. 7, 1978

[54] MULTISTAGE FREEWHEEL FOR BICYCLES

[75] Inventor: Masayoshi Kine, Sakai, Japan

[73] Assignee: Shimano Industrial Company Limited, Osaka, Japan

[21] Appl. No.: 740,038

[22] Filed: Nov. 8, 1976

[30] Foreign Application Priority Data

Nov. 18, 1975 [JP] Japan .................................. 50-139491

[51] Int. Cl.² .......................... F16D 23/00; F16H 9/00
[52] U.S. Cl. ..................................... 192/64; 74/217 B
[58] Field of Search .......................... 192/64; 74/217 B

[56] References Cited

U.S. PATENT DOCUMENTS

| | | | |
|---|---|---|---|
| 1,412,336 | 4/1922 | Carter | 192/64 |
| 2,226,247 | 12/1940 | Lesage | 192/64 |
| 2,988,186 | 6/1961 | Dotter | 192/64 X |
| 3,554,340 | 1/1971 | Shimano et al. | 192/64 |

FOREIGN PATENT DOCUMENTS 412,323  11/1935  Belgium .................... 74/243 B

*Primary Examiner*—Leonard H. Gerin
*Attorney, Agent, or Firm*—Stevens, Davis, Miller & Mosher

[57] ABSTRACT

A multistage freewheel for bicycles, comprising a plurality of at least two sprockets which are divided into at least a low speed stage and a high speed stage which are rotatable independently with respect to a support. Each of the sprockets is separately applied with a rotary resistance so that a single sprocket may be of less resistance thereby securing safety in the operation of the bicycle.

11 Claims, 6 Drawing Figures

MULTISTAGE FREEWHEEL FOR BICYCLES

This invention relates to a multistage freewheel attached to a rear hub of a bicycle and more particularly to a multistage freewheel of a bicycle, which is adapted to be rotatable to allow a driving chain to travel when the bicycle wheels are rotating without cranking, and be in free rotation when the driving chain is restricted from travelling, for one cause or another.

Generally, the multistage freewheel, which is attached to the rear hub for changing the bicycle speed through a derailleur, should be operated during chain travel.

A conventional driving mechanism for a bicycle, however, is so defined that the front sprocket (hereinafter called the front gear) corresponding to the freewheel is fixed to a crank so as to be rotatable therewith, whereby when the crank rotates only then does the chain travel. Thus, it is impossible to change the bicycle speed while the bicycle is running without cranking, for example, while running on a descending path.

In view of the above problem, a driving mechanism for a bicycle has hitherto been suggested in which the front gear is unidirectionally rotatably pivoted to a crank shaft through a unidirectional transmission, which transmission is applied to pawls thereof with a smaller biasing force of a spring than that applied to pawls of a unidirectional transmission of the multistage freewheel at the rear hub, so that the freewheel may be rotatable together with the rear wheel which leads to the front gear rotation and results in travelling of the chain during the wheels rotations even when the pedalling is stopped.

In other words, the multistage freewheel is subject to a rotary resistance greater than that applied to the front gear in its free rotation and the driving force is transmitted from the wheel to sprockets of the freewheel through the rear hub in the bicycle's running, whereby the sprockets are made rotatable together with the hub.

In this instance, a greater rotary resistance applied to the sprockets of the freewheel allows the sprockets to be rotatable together with the rear hub in the absence of the free rotation of sprockets even though the driving chain is subject to some resistance against its travelling, so that the chain may continue to travel. Hence, there is no worsening of speed-changing efficiency, by stopping chain travel caused by the resistance applied thereto against changing the bicycle speed. However, the greater rotary resistance of the sprocket enforces the chain to continue to travel even when a cyclist happens to catch his finger or his pants between the front gear and the chain, which is undesirable from the standpoint of safety.

When shifting through the derailleur to one of sprockets of the multistage freewheel at the rear hub, the chain is guided by a chain guide cage of the derailleur to a selected sprocket, wherein the chain proceeds obliquely to be shifted from one sprocket to another to result in contact of the twisted chain with the sprocket and chain guide cage, at which time resistance against changing the bicycle speed (hereinafter called the speed-change resistance) is imparted to the sprocket.

The more the driving chain contacts the sprocket and chain guide cage, the greater the speed change becomes so as to reach the maximum when the chain is shifted in one operation from the high speed sprocket to the low speed sprocket. Now, in a five stage freewheel provided with five sprockets, if the speed-change resistance applied to the freewheel at the speed-reduction amounted to the average value, for example, of 2 kg per one stage, including the contact resistance of the chain with the chain guide cage, the freewheel will be subject to the resistance of 10 kg when the chain is shifted in one operation from the high speed sprocket to the low speed sprocket. Hence, the driving system capable of changing the speed during the bicycle's running even without cranking (which system is hereinafter called the free-shifter-system), can always be operable under any speed-change condition by setting a value of rotary resistance against free rotation of the freewheel of over 10 kg.

Thus, the sprockets imparted with a rotary resistance value of more than 10 kg, to an extreme, secured to the rear hub, will improve the speed-change efficiency. To the contrary, the sprockets, unless the strength over 10 kg is applied to the chain, will continue to rotate in cooperation with the rear hub so as to keep the chain travelling, resulting in a lack of safety in operation.

In addition, it is important for the free-shifter-system to be superior in safety of operation as well as improve efficiency for changing the bicycle speed.

The invention has been designed to simultaneously satisfy two contrary requirements: Complete safety in operation and improved efficiency in changing the speed. It is therefore an object of the invention to provide a multistage freewheel fully safe in its operation as well as completely effective in changing the bicycle speed under any condition.

The invention is characterized in that the multistage freewheel has two or more sprockets which are divided into a high speed stage and a low speed stage, a unidirectional rotary transmission provided between every diveded sprocket and a support therefor so that each of the divisions may be freely rotatable, and a predetermined rotary resistance against the free rotation applied to every division. The freewheel is adapted to increase rotary resistance in response to each of the speed changing stages at the speed change, especially when speed is reduced, so that the speed-change efficiency is improved and also the divided sprockets have applied thereto only high rotary resistance to rotation in normal running of the bicycle after the speed is changed. Thus complete safety in operation is secured.

Figure 2:
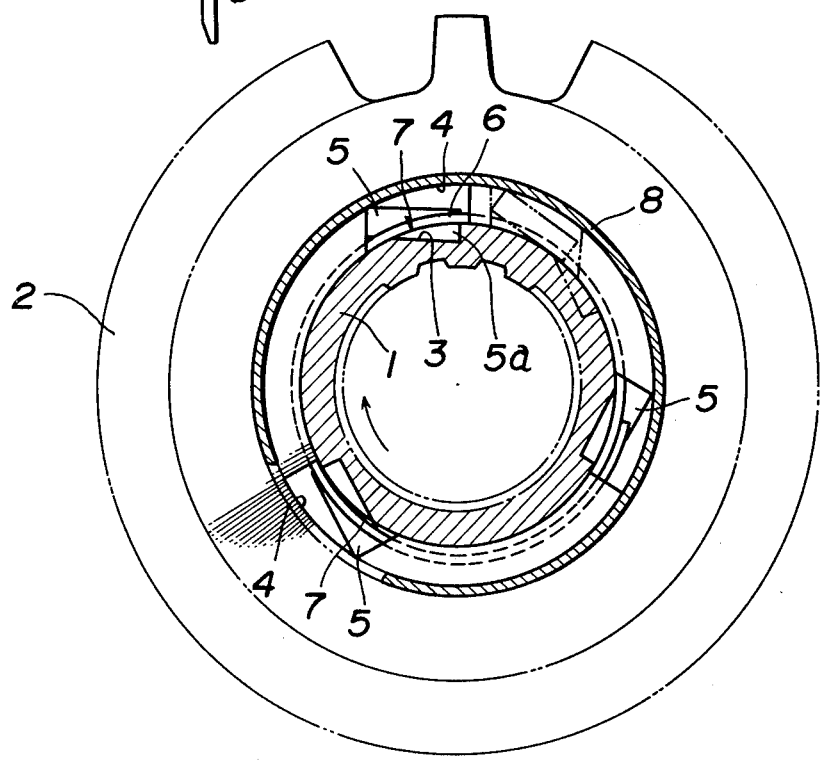
Figure 3:
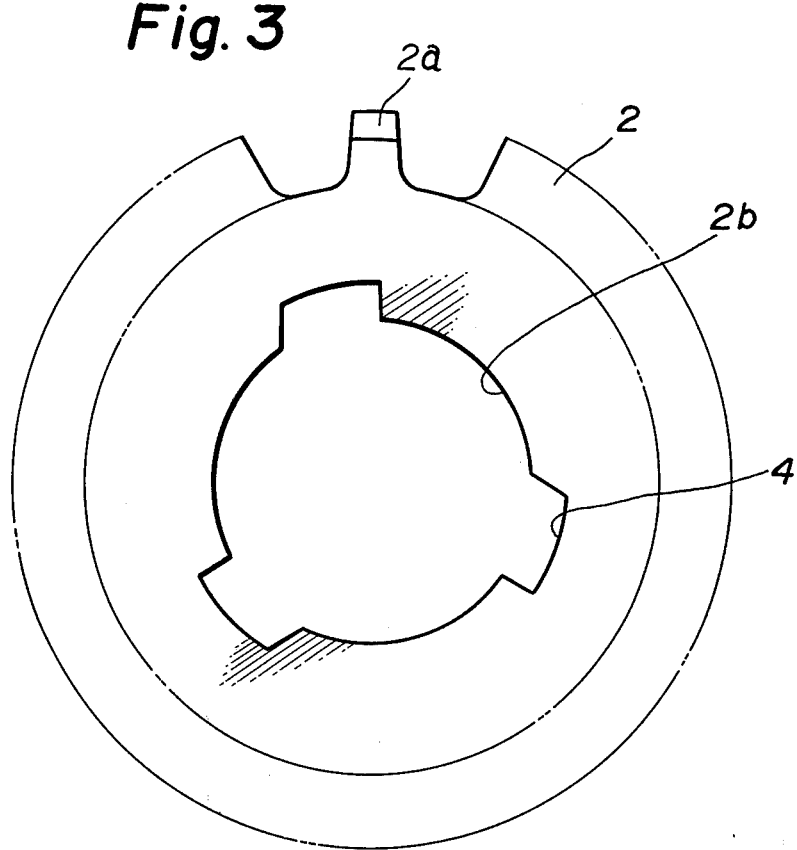
Figure 4:
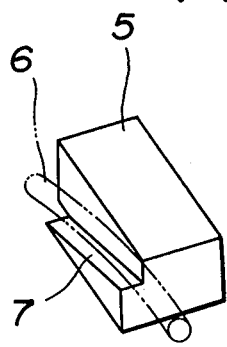
Figure 5:
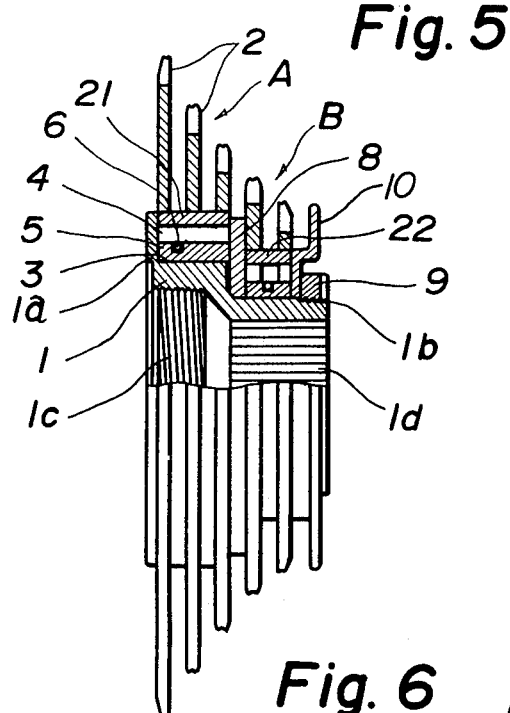
Figure 6:
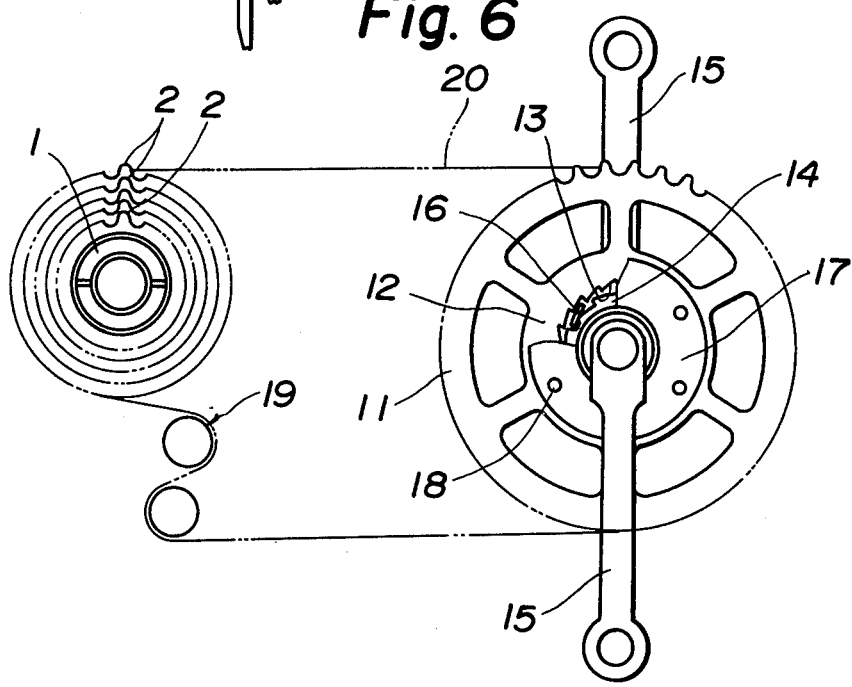

The aforegoing and other objects of the invention will become apparent from the following description of the embodiments with reference to the accompanying drawings, in which:

FIG. 1 is a half longitudinal sectional front view of the freewheel of an embodiment of the invention, FIG. 2 is an enlarged sectional view taken on Line II—II in FIG. 1, FIG. 3 is a front view of the sprocket only of FIG. 2, FIG. 4 is an enlarged perspective view of pawls, FIG. 5 is a half longitudinally sectional view of a modified embodiment of the invention, and FIG. 6 is an illustration showing an example of the application of the freewheel of the invention to the bicycle.

Referring to FIGS. 1 and 2, the reference numeral 1 denotes a support having two cylindrical portions of different diameters and screwable to a rear hub (not shown). The larger diameter portion is provided at one end of the outer periphery thereof with a flange 1a and at the inner periphery with a screw thread 1c through which the support 1 is screwed to the rear hub. The smaller diameter portion is provided at one end of the outer periphery thereof with a screw thread 1*b* and at the inner periphery with splines 1*d* through which the support 1 is secured. At the outer periphery of the support 1 between the flange 1*a* and the screw thread 1*b* are provided five sprocket 2 of different diameters independently rotatably supported on support 1. Between sprockets 2 and support 1 are inserted unidirectional rotary transmissions to be hereinafter described through which each of the sprockets is freely rotatable with respect to the support 1.

Each of sprockets 2, as shown in FIG. 3, is provided at its outer periphery with a plurality of teeth 2*a* and at its center with a round bore 2*b*. Each sprocket differs from another in diameter and number of teeth. Three of the sprockets have larger diameters and a greater number of teeth and are located at the low speed stage, while the other two sprockets are of smaller diameter and number of teeth number and are located on the high speed stage side, that is, three sprockets are supported on the larger diameter portion and two sprockets on the smaller diameter portion. Bore 2*b* of the three sprockets at the low speed stage side to have inner diameters slightly larger than the outer diameter of the larger diameter portion of support 1. The inner diameters of the two sprockets at the high speed stage side are made slightly larger than the outer diameter of the smaller diameter portion of support 1.

Even though support 1, has been defined as having larger and smaller diameter portions, it may be defined as being an even surfaced cylinder.

Each of the unidirectional transmissions, which is provided between each of sprockets 2 and support 1, comprises; a plurality of grooves 3 which are, as shown in FIG. 2, formed at the outer periphery of support 1 to be arranged cirfumferentially thereof and extend axially of the support; a plurality of cutouts 4 which number as many as grooves 3, and which, as shown in FIG. 2, are provided at the inner periphery of bores 2*b* of the sprockets 2 circumferentially thereof and formed in substantially square shapes and pawls 5 which are positioned within cutouts 4 and urged toward the support 1 side at the tips of the pawls by means of ring springs 6 so as to be insertably engageable with grooves 3.

Each pawl 5, as shown in FIG. 4, is formed of a right prism block. The block is provided at its one side with a recess 7 insertably engageable with spring 6; the recess having an outward arcuate bottom descending from the front side to the rear in the forward direction of the normal rotation of the sprocket.

Each of springs 6 is ring shaped and serves to urge pawls 5 to mesh with grooves 3 in a manner such that corner 5*a* of each of pawls 5 is always urged toward the outer periphery of support 1.

Although, the pawls 5 have been described as being provided at every sprocket they may be rearranged. The arrangement that the pawls 5 are inserted into the cutouts 4 of sprockets 2 and the grooves 3 at the outer periphery of support 1, may be reversed, that is, pawls 5 are supported in support 1 grooves 3 are formed in bores 2*b* of sprockets 2.

In the freewheel described, when one of the sprockets 2 is rotated the engagement of pawls 5, with the grooves 3 allows both one sprocket 2 and support 1 to rotate together. On the other hand, when support 1 is rotated by the wheel rotations of the bicycle running the disengagement of pawls 5 from grooves 3 allows support 1 only to rotate and sprocket 2 not to rotate together with support 1 but to be in free rotation. Therefore, the predetermined rotary resistance against the free rotation is applied to each of sprockets 2 so that sprocket 2 may be rotatable with support 1 because of the resistance.

The rotary resistance against the free rotation allows each of sprockets 2 to rotate together with support 1 which is rotating with the rear hub in the bicycle's forward running, whereby sprocket 2 rotates as long as the bicycle advances even without cranking. Thus the driving chain is travelling and may be shifted to the desired one of sprockets 2.

The rotary resistance is applied to each of sprockets 2 in such a manner that the largest diameter sprocket at the outermost side of the low speed stage is supported in abutment against the inner surface of flange 1*a* formed at one end of the outer periphery of support 1, spacers 8 are inserted between each of sprockets 2, and a nut 9 is screwed onto thread 1*b* at the other end of the outer periphery of support 1, so that each of the sprockets 2 may be tightened by nut 9 through the spacers 8. The tightening strength of nut 9 affords the rotary resistance to sprockets 2 against free rotation thereof.

Also, the rotary resistance is adjustable by the degree to which nut 9 is screwed onto thread 1*b*. When the driving chain is imparted with the external force to restrict it from travelling by a resistance more than the preset value of the rotary resistance, i.e., the chain is prevented from travelling sprocket 2 is released from cooperation with the support 1 and only support 1 rotates.

Furthermore, the rotary resistance value is smaller than the external force applied to the chain when a cyclist catches his fingers between, sprocket 2 and the chain, thereby securing safety in the running of the bicycle. For example, safety is fully insurable by limiting the rotary resistance value to an amount such that the maximum value of speed-change resistance is divided by the number of sprockets 2.

In addition, the freewheel is safety insurable even when it has a rotary resistance value considerably greater than the divided amount. For example, when the illustrated freewheel, capable of five stage speed changing, is made to have a rotary resistance nearly equal to the speed-change resistance when the chain is shifted from the highest speed sprocket to a middle speed sprocket 2 over one therebetween, the safety also will be insured.

However, it is most preferable that each of sprockets 2 is rotatably supported on support 1 and applied with a rotary resistance of a value as small as the divided amount. Besides this, five sprockets 2 divided into one sprocket and two groups of two each may be applied with a rotary resistance to each of the divisions as well as five sprockets divided into two groups, i.e., one of three and one of two sprockets. In the latter case, the three sprocket group and the two sprocket group as shown in FIG. 5 are formed in two groups at the low speed stage and the high speed stage respectively. The groups of three sprockets, connected with a tubular body 21 therethrough, is named a first sprocket group A and that of two sprockets, connected with a tubular body 22, is a second sprocket group B. Between the groups A and B and the tubular members 21 and 22 are provided first and second unidirectional rotary transmissions, respectively. The rotary resistance is applied to the groups A and B through spacer 8 inserted therebetween and nut 9 screwed to tighten the sprockets in each group respectively. The rotary resistance should correspond to the number of sprockets included in each of the groups A and B and be made larger than the speed change resistance applied to each of the same. Accordingly, groups A and B are applied with rotary resistances of values twice and three times respectively of the aforesaid divided amount so that safety in operation may be fully insured. In brief, it is enough for safety to apply to every one of sprockets 2 the rotary resistance based on that preset to have a value as much as being fully insurable of the safety, or to preset two or three or more sprockets 2 with a rotary resistance corresponding to these sprocket numbers in the range not more than the aforesaid safety value. In addition, in FIGS. 1 and 5 reference numeral 10 denotes a chain guard.

The aforesaid freewheel of the invention, as shown in FIG. 6, used together with a front gear 11, thus constituting the so-called free-shifter-system driving device.

Front gear 11 is provided at its center with a boss 12, ratchet teeth 13 are formed at the inner periphery of a center bore of boss 12, pawls 16 in mesh with ratchet teeth 13 are provided at the outer periphery of a cone integrated with a crank 15, and front gear 11 and a crank shaft 14 are rotatably connected through bearings so that front gear 11 may be allowed to be unidirectionally rotatable relative to the crank through a unidirectional rotary transmission comprising ratchet teeth 13 and pawls 16. In FIG. 6, reference numeral 17 denotes a cover; 18, a set screw; 19, a derailleur; and 20, the driving chain.

The function of the freewheel of the invention will be described hereinafter with respect to FIG. 6.

The crank shaft 14 is rotated by pedalling, which by means of pawls 16 in mesh with ratchet teeth 13 allow front gear 11 to rotate normally and thereby cause driving chain 20 to travel. Driving chain 20 in travelling rotates sprocket 2 at the rear wheel side which in turn rotates the rear wheel through pawls 5 at cutouts 4, grooves 3 in mesh with pawls 5, and support 1.

When the chain is travelling by pedalling, the derailleur 19 is as usual operated to shift the chain to the desired sprocket thereby changing the bicycle speed.

When the bicycle is coasting, i.e., without pedalling, support 1 rotatable with the rear hub causes sprocket 2 through the rotary resistance applied thereto to rotate together with the support 1.

Therefore, the chain travels together with the rear wheel, which differs from the conventional bicycle. At this time, the front gear also rotates following the chain travel, but pawls 16 are not meshed with ratchet teeth 13 so that the front gear idles thereby transmitting no rotation to the crank shaft. The derailleur thus is operable by operating the control lever so as to shift the chain to the desired sprocket while rotation of the crank shaft 14 is stopped.

When the chain is shifted in one operation from a high speed sprocket to a low speed sprocket the chain is subject to the maximum speed change resistance, while, the rotary resistance on each of the sprockets is totalized correspondingly to the number of speed changing stages. Since the total rotary resistance exceeds the maximum speed change resistance the sprockets are not free thereby insuring the shifting of chain 20.

After the speed change is completed the chain is subject to light rotary resistance of the chain-shifted sprocket to result in travelling under such light resistance.

Furthermore, in case chain 20 becomes jammed between front gear 11 and the bicycle frame so as to be restricted from travelling, or a cyclist catching his fingers between the front gear 11 and the chain, the cooperation of sprocket 2 with support 1 is immediately released to result in rotation of support 1 only.

Accordingly, there is no fear that a stoppage of the chain's travelling causes support 1 to stop its rotation, resulting in a sudden braking of the rear wheel, or that even if the cyclist catches his fingers between the chain and sprockets the chain will continue to travel without stopping, resulting in a further catch. Thus, not only does the bicycle run in safety but also an accident at standstill can be prevented.

Support 1, which is separately mounted on the rear hub in the aforesaid embodiment, may be integral with the hub, or may serve as an inner member combined with a separate outer member to which sprockets 2 are attached as aforesaid. In this situation the unidirectional rotary transmission also is inserted between the inner and outer members and the latter is applied with the predetermined rotary resistance.

As clearly understood from the above-mentioned description, the freewheel of the invention has sprocket wheels which are divided into at least two groups at the high speed stage and at the low speed stage, and each of the groups is supported on the support in a rotatable relation with respect thereto through the unidirectional rotary transmission and applied with predetermined rotary resistance against free rotation. Hence, the rotary resistance applied to the single sprocket or the sprocket group can be made smaller than the total of the sprockets of the conventional freewheel thereby making it possible to improve highly the safety during the bicycle's running and also fully insure a good speed-changing efficiency.

While a preferred embodiment of the invention has been described using specific terms, such description is for illustrative purpose only, and it is to be understood that changes and variations may be made without departing from the spirit or scope of the following claims.

What is claimed is:

1. A multistage freewheel for a bicycle, comprising;
    (a) at least two sprockets,
  each of said sprockets having at the outer periphery thereof a plurality of teeth and at the center a round bore, said teeth varying in number on each of said sprockets.
    (b) a cylindrical support individually rotatably supporting each of said sprockets thereon;
    (c) at least two unidirectional rotary transmissions provided between the inner periphery of said round bore of each of said sprockets and the outer periphery of said support;
  said transmissions allowing each of said sprockets to be in free rotation independent from each other; and
    (d) means for applying rotary resistance to each of said sprockets in the free rotation thereof.

2. The multistage freewheel as set forth in claim 1, wherein each of said unidirectional rotary transmissions, comprising pawls and grooves engageable therewith, said pawls being insertably mounted into cutouts formed at said round bore of each of said sprockets, said engaging groove being provided axially of said support at the outer periphery thereof.

3. The multistage freewheel as set forth in claim 2, wherein said pawls are provided on said support and said engaging grooves on said round bore of each of said sprockets.

4. The multistage freewheel as set forth in claim 1, wherein said rotary resistance applying means comprises a flange on one end of the outer periphery of said support, a screw thread formed axially at the other end of the outer periphery of said support and a tightening nut screwed with said thread, so that the desired rotary resistance may be applied to each of said sprockets through the tightening strength from said nut.

5. The multistage freewheel as set forth in claim 1, wherein said rotary resistance applied to each of said sprockets by means of said rotary resistance applying means is valued at an amount more than the maximum value of the speed-change resistance divided by the number of said sprockets, said speed-change resistance being applied to said sprockets when the bicycle speed is changed.

6. The multistage freewheel as set forth in claim 4, wherein said flange is of a greater diameter than that of said round bore of each of said sprockets, so that said flange is brought into contact with the sprocket of the maximum teeth number and said tightening nut is allowed to be tightened toward said flange side.

7. A multistage freewheel for a bicycle, comprising:
 (a) at least one group including a set of at least two sprockets and at least a single sprocket,
said sprockets of the group and single sprocket having at the outer peripherys thereof a plurality of teeth differing in number from each other;
 (b) a cyclindrical support individually rotatably supporting said sprocket group and single sprocket thereon;
 (c) a set of first unidirectional rotary transmissions provided between said sprocket group and said support,
said transmissions allowing said sprocket group to be in free rotation independent with respect to said single sprocket;
 (d) at least one second unidirectional rotary transmission provided between said single sprocket and said support,
said transmissions allowing said single sprocket to be in free rotation independent with respect to said sprocket group; and
 (e) means for applying the rotary resistance to said sprocket group and single sprocket in said free rotation thereof.

8. The multistage freewheel as set forth in claim 7, wherein the sprockets of said sprocket group are connected with a tubular member having an inner diameter greater than the outer diameter of said support and said first unidirectional rotary transmission is provided between the inner surface of said tubular member and the outer periphery of said support.

9. The multistage freewheel as set forth in claim 8, wherein said first unidirectional rotary transmission comprises ratchet teeth and pawls in mesh therewith, said ratchet teeth being provided at one of said outer periphery of the support and said inner surface of the tubular member, said pawls being provided at the other.

10. A multistage freewheel for a bicycle, comprising:
 (a) at least two groups of sprockets with at least two sprockets in each group,
each sprocket of said sprocket groups having at the outer periphery thereof a plurality of teeth, said teeth being different in number from every other sprocket;
 (b) a cylindrical support individually rotatably supporting each of said sprocket groups thereon;
 (c) a unidirectional rotary transmission provided between each of said sprocket groups and said support,
said transmission allowing each of said sprocket groups to be in free rotation independent from each other; and
 (d) means for applying rotary resistance to each of said sprocket groups in free rotation thereof.

11. The multistage freewheel as set forth in claim 10, wherein a single sprocket is combined with said first and second sprocket groups.

* * * * *